Feb. 1, 1927.

G. CHRISTENSON 1,616,412

PACKING FOR PLUNGERS AND THE LIKE

Filed Jan. 24, 1925

Inventor:
George Christenson
by Roberts, Roberts & Cushman
Attys.

Patented Feb. 1, 1927.

1,616,412

UNITED STATES PATENT OFFICE.

GEORGE CHRISTENSON, OF NORTH PLAINFIELD, NEW JERSEY, ASSIGNOR TO JOHNS-MANVILLE INCORPORATED, OF NEW YORK, N. Y., A CORPORATION OF NEW YORK.

PACKING FOR PLUNGERS AND THE LIKE.

Application filed January 24, 1925. Serial No. 4,627.

This invention relates to packings for piston rods, plungers, and the like and has for its main object the provision of a packing which will remain efficiently fluid-tight under conditions which may involve swaying or movement of the piston or plunger out of true line, or extremes of expansion and contraction under variations in temperature.

As will be more explicitly set forth and described, these objects are attained by the employment of a packing which in itself comprises a compressible elastic backing and a less compressible, less elastic region at and near the working surface of the packing.

In the drawings hereto annexed which illustrate an example of this invention,

Figure 1:
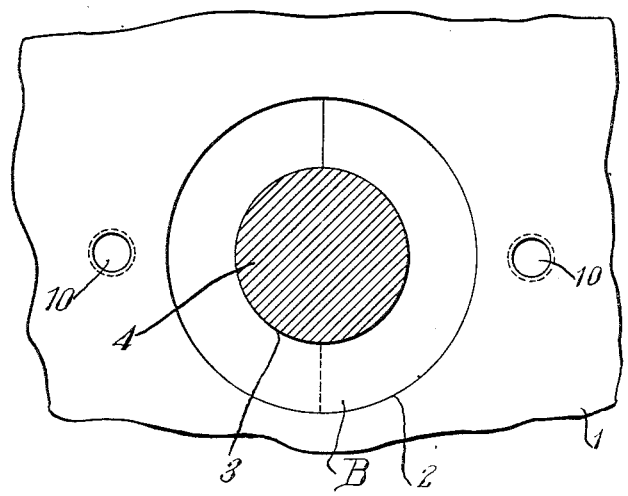
Fig. 1 is a top plan view of a stuffing box with the gland removed, showing the piston in cross section.

In these drawings 1 represents the head of a cylinder in which a cylindrical recess 2 surrounds the aperture 3 through which a piston 4 may reciprocate. The packing which is lodged in the recess 2 comprises in the preferred form shown two members A and B which are, however, substantially alike so that a description of one will suffice for both. The gland B by means of the screw bolt and nut contrivance 9 and 10 functions in the usual manner to hold and compress the packing in the box.

Figure 3:
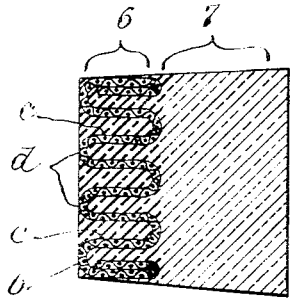
Fig. 3 (on a larger scale) is a cross section of one of the packing members as the same would appear when the packing is not under compression and in use.

Each packing member, A for example, consists of a ring composed mainly of compressible elastic material such as rubber, rubber substitute or rubber composition. This composition is however preferably not uniform; as indicated in Fig. 3 the inner region, that is to say the region nearest the bearing surface of the packing as shown at 6 and further designated by relatively heavy cross hatching, is so compounded that its material is denser, more rigid, less elastic than that of the outer region 7 further designated by relatively lighter cross hatching. The harder material in the region 6, in addition to providing relatively great rigidity is characterized by smoother, harder surface than the softer material in the region 7. In order that the packing member such as A shall be unequally compressed when in position in the stuffing box, each packing ring as in the illustration, is characterized by a cross section which flares radially outward from the bearing or piston-engaging surface. Thus the relatively elastic compressible cushioning region 7 normally has greater dimension with respect to the line of application of compressing force than the inner more rigid region 6. The object is so to determine the qualities of the material in the bearing and backing regions of the packing member that when the packing is in position in the stuffing box and compressed by a gland the packing or cushioning portion shall be reduced in volumetric dimension to a greater degree than the less compressible, less elastic bearing region. In the instance shown this object is attained by molding the packing members A and B with the outwardly flaring cross section indicated in Fig. 3.

Furthermore, in order to enhance the efficiency of the packing members it is preferred to have the inner region such as 6 reinforced by fabric $b$ and preferably to have this fabric laid in closely contiguous convolutions of which the turns $d$ present themselves at the inner or bearing surface of the packing, the layer portion $c$ lying fairly close together. In the form of packing members here shown such reinforcing fabric will preferably be cut on the basis, if the fabric be woven in the usual manner, so that by distortion of the mesh the fabric may be made to accommodate itself to the required disposition around and near the inner bearing surface of the packing.

Figure 2:
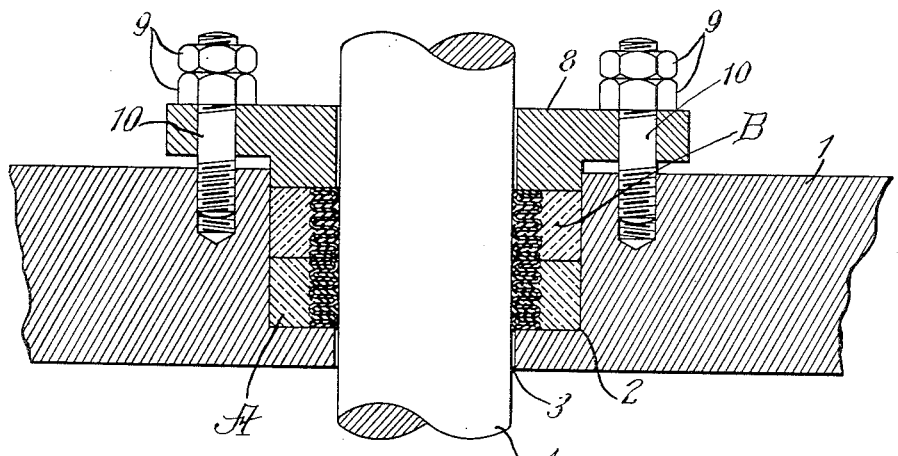
Fig. 2 is a cross section of such a stuffing box showing a portion of the piston in side elevation.

When packings of the character above described are put in place in the stuffing box as indicated in Fig. 2 and the gland 8 is screwed down, the outwardly flaring relatively elastic cushioning or backing portions 7 will be compressed in markedly greater degree than the inner regions such as 6. The expansive effort exerted by the compressed cushioning portions of the packing members in all directions, finds itself rigidly opposed by the metal surfaces of the stuffing box and gland and operates to press the inner bearing surface against the piston 4 and will maintain this pressure yieldingly so as to accommodate the packing itself to movements of the piston out of normal or correct line, and also to thermal expansions and contractions of the metallic members which constitute the environment of the packing. The harder, less yielding region 6 affords an excellent surface for fluid lubricants and also resists wear; in the latter function it will be materially assisted by the presence of cementitiously embedded fabric such as *b.*

I claim:

1. In a packing for pistons and the like, a packing member comprising a relatively compressible and elastic backing portion and a relatively harder and less yielding bearing portion, the said packing member so proportioned that when confined in a stuffing box the backing portion shall be compressively diminished in volume to a greater degree than the bearing portion, the bearing portion reinforced by cementitiously embedded fabric.

2. In a packing for pistons and the like, an integral packing member of material having the characteristics of rubber comprising a relatively compressible and elastic backing portion and a bearing portion of relatively harder and less yielding material, said backing portion having a longer dimension than said bearing portion whereby in use in a stuffing box the backing portion shall be compressively diminished in volume to a greater degree than the bearing portion.

Signed by me at Manville, N. J., this 19th day of January, 1925.

GEORGE CHRISTENSON.